United States Patent [19]

Mathews et al.

[11] Patent Number: 4,593,286

[45] Date of Patent: Jun. 3, 1986

[54] METHOD OF OPERATING AN AGILE BEAM COHERENT RADAR

[75] Inventors: Bruce D. Mathews, Catonsville; James H. Mims, Millersville, both of Md.

[73] Assignee: Westinghouse Electric Corp., Pittsburgh, Pa.

[21] Appl. No.: 488,236

[22] Filed: Apr. 25, 1983

[51] Int. Cl.⁴ .......................... G01S 7/42; G01S 13/72
[52] U.S. Cl. .................. 343/7 A; 343/5 DP; 343/17.1 PF
[58] Field of Search ............... 343/5 DP, 7 A, 7.7, 343/9 R, 17.1 R, 17.2 R, 7.4, 7.5, 17.1 PF

[56] References Cited

U.S. PATENT DOCUMENTS

| | | | |
|---|---|---|---|
| 3,858,206 | 12/1974 | Scheidler et al. | 343/7 A |
| 3,858,208 | 12/1974 | Parke et al. | 343/7.5 |
| 4,005,415 | 1/1977 | Kossiakoff et al. | 343/5 VQ |
| 4,015,261 | 3/1977 | Campbell | 343/18 E |
| 4,040,054 | 8/1977 | Overman | 343/7 A |
| 4,057,800 | 11/1977 | Ganz | 343/8 |
| 4,077,038 | 2/1978 | Heller et al. | 343/7 A |
| 4,079,378 | 3/1978 | Hulderman | 343/17.1 R |
| 4,106,019 | 8/1978 | Alexander et al. | 343/9 |
| 4,130,821 | 12/1978 | Goldie | 343/17.1 R |
| 4,143,373 | 3/1979 | Chernick | 343/17.1 PF |
| 4,155,088 | 10/1980 | Taylor, Jr. et al. | 343/7.7 |

FOREIGN PATENT DOCUMENTS 2412852 12/1977 France .

OTHER PUBLICATIONS

Fleskes et al., "Adaptive Control and Tracking with the ELRA Phased Array Rader Experimental System", Apr. 1980, pp. 8–13, IEEE International Radar Conf., Arlington, VA.

A. Farina and P. Neri, "Multitarget Interleaved Tracking for Phased-Array Radar"; IEEE Proc. vol. 127, Pt. F No. 4, Aug. 1980.

Primary Examiner—T. H. Tubbesing
Assistant Examiner—Gilberto Barrón, Jr.
Attorney, Agent, or Firm—W. E. Zitelli

[57] ABSTRACT

A method of time scheduling mode dwell times corresponding to a multiplicity of targets, displaced in angle, range and velocity, in the frame time of an agile beam coherent radar without reducing the performance of the radar is disclosed. Targets corresponding to a plurality of target mode dwell times scheduled to a common time interval are grouped into a set of pulse repetition frequencies (PRF's) which make the targets visible in both range and doppler. The radar is varied to a different of the set for each coherent integration time of the common time interval. The mode dwell times of the targets of a PRF grouping are interleaved in their corresponding coherent integration time by time positioning the different target time event patterns with respect to the fixed interpulse period thereof to avoid eclipsing of the time events. The time positioning of the event patterns includes a combination of trial positioning and translating each of the target event patterns in a prioritized manner with the purpose of avoiding eclipsing of the time events thereof. The translating of a former target pattern to a new trial position may be performed by delaying the pattern start phasing thereof with respect to the fixed interpulse period of the corresponding integration time.

8 Claims, 7 Drawing Figures

METHOD OF OPERATING AN AGILE BEAM COHERENT RADAR

BACKGROUND OF THE INVENTION

The present invention relates generally to a method of operating a coherent radar, and more particularly, to a method of operating an agile beam coherent radar in an increasing target environment without reducing the performance thereof.

Surveillance radars of the early warning or advanced warning variety are generally operative to perform a variety of mission tasks or functional modes, such as searching, tracking and the like in a multiple target environment. Usually, the performance of a radar is measured in accordance with the duration of its frame time, which is the time during which all of the required modes are to be performed by the radar for as many targets detected and searchable areas designated. In a single target mode operation, which will be described in greater detail herebelow, the frame time may shrink or swell depending upon the density of the target environment in which it is operating. For an airborne surveillance radar, the lowest fundamental periodic cycle of the frame time is conventionally based on the time the radar has to detect each new target as it becomes visible over the horizon, which may be on the order of 10 seconds for contemporary systems. For this example, should the frame time swell in excess of the 10 second period requirement because of an increase in the target environment, the potential for missing a target during the searching modes will be commensurately increased therewith.

The aforementioned shortcoming results from the single target mode operation; however, this problem may be alleviated by transferring to an interleaved mode operation within the frame time of the radar. To better understand these operational modes, it will be necessary to probe into what is occurring within the frame time. For each target and functional mode associated therewith, there is an operational time duration, known as the mode dwell time, which is the time required by the radar to illuminate the target, receive radar data therefrom, and extract information from the radar waveform necessary to fulfill the prespecified function of the mode. In general, a mode dwell time may include on the order of three to five coherent integration times or radar looks, with each look including a predetermined number of interpulse periods for coherent integration. For example, for a 64-point Fast Fourier Transform (FFT), there is required 64 interpulse periods for each coherent integration time. In addition, there is a mode updating frequency which is the frequency at which information is desired from a functional mode or task, like the track update frequency on a particular target, for example, which may be dependent upon the speed, range . . . etc. of the particular target. For the search mode, in most cases, the mode update frequency corresponds to the largest allowable frame time.

For the most part, the aggregate of the search mode dwell times consumes the largest portion of the frame time and may be as much as 80% or more thereof. This, of course, leaves a small percentage of the frame time to perform all of the other mode functions required for the detected targets. In the single target mode of operation, the predetermined number of mode dwell times are spread out along the time axis of the remaining portions of the time frame. In those instances in which the target density increases to a point of overloading the allowable frame time, some interleaving of mode dwell times becomes necessary in order to stay within frame time mission requirements.

To understand this process of mode interleaving, it is convenient to think of the frame time being partitioned into some number of time quantizations or slots which may or may not be of equal duration. As indicated above, a majority of the time slots are filled by dedicated regional mode searches so that there may be only a small percentage of empty time slots in which to insert the other required mode dwell time operations for the detected targets in accordance with the update frequency thereof. When there is more than one mode which is scheduled to be executed during the same time slot as a result of mode update frequency, for example, the time slot becomes under competition. In general, this time slot under competition is greater in duration than the mode dwell time, but less than the time for a separate mode dwell for each competing target. A method of resolving the competition is to interleave or merge two or more mode dwell times into a single time interval. As a result of the scheduled interleaving of the mode dwell times, the overall frame time may be maintained within the bounds of the frame time mission requirement.

The concept of merging two or more mode operations into a given time interval of the frame time involves primarily the interleaving of the radar time events associated therewith. Remember that each of the mode dwell times comprises a number of coherent integration times or radar looks each including a large number of interpulse periods forming a train of transmission and echo pulses corresponding thereto. Thus, it is these trains of pulses and corresponding switching times which have to be interleaved during the merging operation. Consequently, it is not a simple matter of merely scheduling two or more mode operations for the same designated interval of time in the frame time. There must be some order or priority selected for the time event patterns associated with each of the mode operations so as to eliminate the possibility of eclipsing or event coincidence, the consequences of which would, more than likely, result in a loss of vital information. This interpulse interleaving should be adaptable from one frame time to another because of the changing target environment and system mode requirements. That is, since the interpulse scheduling is applied on a coherent look basis, everytime there is a new mode dwell time operation to be merged in the same time interval of the frame time, there will have to be a new scheduling arrangement of interpulse events. Another difficulty which may arise in some instances is that the multiple pulse trains being merged may each have a different pulse repetition frequency (PRF) in which case the pulses of a train with a short interpulse period will reappear more rapidly than the pulses of a train having longer interpulse periods. As a result of this phenomenon, a series of respective pulse trains running through each other is created during the merge which may give rise to a higher probability of eclipsing.

An example of a method of simply interleaving pulse trains of a radar for increasing the data rate thereof is disclosed in a French Patent Application No. 2,412,852; entitled "Improvements To Pulse Doppler Radars"; filed Dec. 22, 1977 by Jean-Louis Gaston Bossenec et al.

and assigned to Laboratories Central de Telecommunications, France. This method involves the use of simultaneous interleaved pulse trains whose pulse repetition frequencies (PRF's) are constructed from irrational numbers which prevent absolute alignment of the transmit pulses in time throughout a coherent integration period. One drawback is that upon reception, echo pulses of PRF differing trains may partially eclipse each other. The eclipsing is minimized by the substitution of calculated pulse estimates for the destroyed pulses during post-processing operations. The method appears to be intended for reducing the time for determining unambiguous target range and/or doppler for several ambiguous measurements from the same target. Application to a beam agile radar for a multiple target environment is not mentioned.

The method described herebelow in the preferred embodiment section provides a technique which is intended to avoid the pulse conicidence or eclipsing drawback in the merging operation of multiple functional modes in the same designated time interval of a frame time by a technique of scheduling the interpulse interleaving events in accordance with a selected set of PRF's adaptable to the instantaneous target environment and desired mode operation associated therewith.

SUMMARY OF THE INVENTION

In an agile beam coherent radar, a method of time scheduling mode dwell times corresponding to a multiplicity of targets, displaced in angle, range and velocity, in a radar frame time without reducing the performance of the radar is provided. The method includes the steps of: scheduling a plurality of the target mode dwell times to a common time interval of the radar frame time; grouping the targets of the common time interval into a set of pulse repetition frequencies (PRF's) which make the targets visible in both range and doppler; setting the PRF of the radar for each coherent integration time of the time interval to a different PRF of the set, correspondingly; and interleaving the time event patterns of the targets of a PRF grouping for a coherent integration time in accordance with a predetermined rule to avoid eclipsing of the time events thereof, whereby data gathering from targets in multiple beam positions may be performed in a time conventionally used for a single line of sight of the radar.

The PRF groupings of the set may be prioritized from a highest to a lowest priority and the PRF of the radar may be varied in the same PRF sequence corresponding to the coherent integration times of the common time interval. The priority may be assigned according to the number of targets grouped in each of the PRF groupings. Moreover, the method may include the step of prioritizing the targets within each PRF grouping preferably in accordance with a vital parameter significant to scheduling the mode processing thereof. Furthermore, the step of interleaving may include interleaving the time event patterns of the targets of a PRF grouping by time positioning the different target event patterns with respect to the interpulse period of the PRF of the target grouping to avoid eclipsing of the events. In this manner, the time events of the interpulse period set by the PRF are scheduled in accordance with a fundamental periodic construct to achieve merging of the target mode dwell times in the common time interval in a non-conflicting fashion. A further step may also be included to form a new group of targets from any target-time event pattern which could not be time positioned with respect to the interpulse period to avoid eclipsing of time events.

In another aspect of the present invention, a method is provided for scheduling time events with respect to a fixed interpulse period used as a fundamental periodic construct of a coherent integration period of the radar to achieve merging of a plurality of targets competing for the coherent integration period. The method comprises interleaving the time event patterns of the plurality of targets of a common coherent integration period by time positioning the different target time event patterns with respect to the fixed interpulse period thereof to avoid eclipsing of the time events. This method may include the step of trail fitting the time event patterns of the competing targets in time position with respect to the fixed interpulse period with a purpose of avoiding eclipsing of the time events thereof.

More specifically, a former target pattern of the plurality may be initially time positioned to a trail position with respect to the fixed interpulse period. It is next determined if the trial position renders eclipsing of time events of the former target pattern with time events of previously fitted target patterns. When a trial position is determined to render eclipsing of time events, the former target pattern is translated to a new trial position by varying, preferably by delaying, the pattern start phasing thereof with respect to the fixed interpulse period.

The aforementioned method may include the steps of: prioritizing the competing targets from a highest to a lowest priority level; and trail fitting the time event patterns of the competing targets in time position with respect to the fixed interpulse period, starting with the highest priority and continuing to the lowest priority of the competing targets, with the purpose of avoiding eclipsing of the time events thereof.

DESCRIPTION OF THE PREFERRED EMBODIMENT

Figure 1:
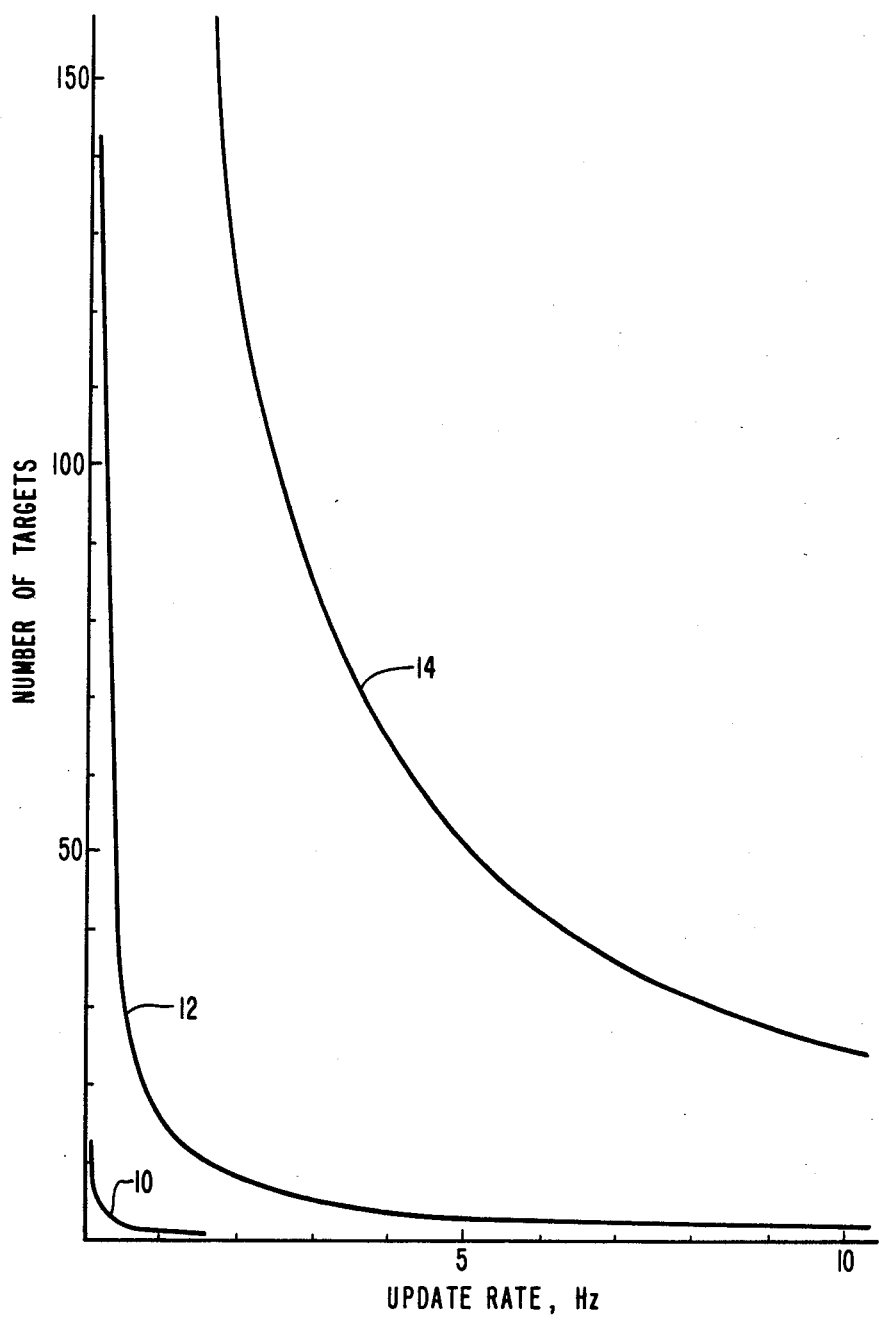
FIG. 1 is a graphical illustration comparing the operational characteristics of a number of different radar antenna systems.

It is readily apparent that the number of targets which may be included in a constrained frame time depends upon the beam agility of the radar antenna system. A graphical illustration comparing the operational characteristics of a number of different radar antenna systems is exhibited in FIG. 1. The graph of FIG. 1 is based on radar parameters for a track-while-scan scheme of operation. For this example, the radar parameters are:

PRF=10 KHz
FFT=64 points
Frame Time=5 seconds
Search Time=4 seconds

Each of the curves 10, 12 and 14 of the graph of FIG. 1 are representative of the product of the number of targets to be tracked $N_t$ and the update frequency for target tracking $\omega_t$, (i.e. $N_t\omega_t$).

In measuring beam agility, the important factor is the beam switching time, denoted as $\Delta t$, which is the time it takes to transit the radar beam from one arbitrary position to another. For a conventional mechanically scanned antenna, this time is based on the slewing rate of the antenna mechanism which is approximately 60°/second. However, electronically steered phased array antennas operate differently. Each element thereof has an individual transmitter, amplifier and phase shifter which together allow the radar beam to be steered electronically to a particular direction. Present radar antenna systems using individually commanded ferrite phase shifters in each antenna element have significantly reduced $\Delta t$ to figures on the order of 200 microseconds. Even more sophisticated phased arrays comprising phase shifters constructed from rapidly switching microwave circuits, like microwave gallium arsenide field effect transistor switches, provide an even faster $\Delta t$ on the order of one microsecond or so.

A mathematical analysis of the exemplary track-while-scan scheme of operation of a multimode radar may be accomplished through the following discussion. The scheme is based upon an interleaving of track mode dwell times while searching a specific coverage volume in space. The following mathematical expression (1) illustrates the constraint on frame time:

$$t_f = t_s + t_t \quad (1)$$

where $t_f$ is the constrained frame time, $t_s$ is the total time devoted to searching, and $t_t$ is the total time devoted to tracking which is equal to the summation of the tracking mode dwell times $t'_t$ required to provide the update frequency among targets. A sufficiently accurate prediction of $t_t$ is shown mathematically as follows:

$$t_t = \Sigma\, t'_t \text{ (individual dwells)} \quad (2)$$
$$= N_t\, t_f \omega_t\, (t''_t + \Delta t)/N_p \quad (3)$$

where:
  $N_t$=the number of targets to be tracked;
  $\omega_t$=the update rate for target tracking;
  $t''_t$=the tracking mode time (usually the coherent integration time of the track mode);
  $t_f$=radar system frame time;
  $N_p$=the number of targets updated per track mode; and
  $\Delta t$=time to transmit from an arbitrary search position to an arbitrary track beam position, or vice versa.

An efficient organization of the receive and transmit events at an interpulse period may increase the number of targets updated for track mode, $N_p$ as illustrated mathematically by the following formula:

$$N_p \leq IPP \cdot P_{\mathit{eff}}/(2\Delta t + N\tau) \quad (4)$$

where:
  IPP=the interpulse period;
  $\Delta t$=beam switching time;
  N=number of pulse widths required for an accurate track, generally the summation of transmit and receive events which may be equal to 3 cells for an uncompressed twogate tracker;
  $\tau$=pulse width; and
  $P_{\mathit{eff}}$=the efficiency with which the interpulse period can be arranged to accommodate the sequencing of target events. For example, for a good scheduling of switching, receive, and transmit, $P_{\mathit{eff}}$ may equal about 0.75.

Curves 10, 12, 14 of the graph of FIG. 1 represent the constraint on the number of targets which may be included in a constrained frame time for mechanical antenna systems, antenna systems using ferrite elements for phase shifting, and antenna systems using semiconductor elements for phase shifting, respectively. The antenna systems utilizing semiconductor phase shifter elements can implement a new phase delay through the antenna element in times short compared to a pulse width of the radar, hence the resulting figures of $N_p = 16$ and $\Delta t = 1$ microsecond are related to other limiting mechanisms in support of the beam agility data rate thereof.

Figure 2:
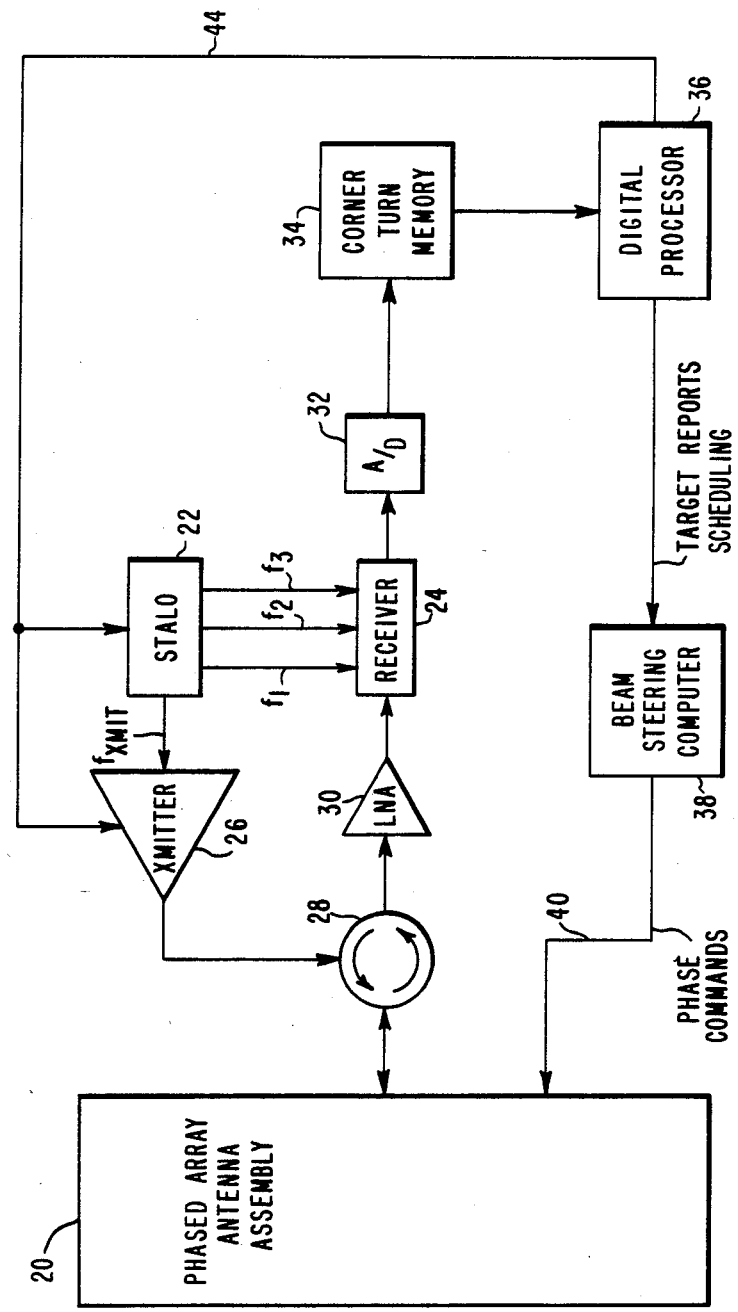
FIG. 2 is a simplified block diagram schematic of an agile beam coherent radar suitable for embodying the principles of the present invention.

A radar embodiment for obtaining increased data rates through utilization of the technique of interleaving interpulse periods of conventional pulsed doppler radar wave forms competing for the same time slot or slots of a frame time is shown in the simplified block diagram schematic of FIG. 2. Beam and frequency switching speeds approaching one microsecond, for example, may improve the separation of the spectrums of radar returns with respect to the desired lines of sight in time.

Referring to FIG. 2, the embodiment includes an antenna 20 with a phased array of elements having corresponding semiconductor phase shifters, a stable local oscillator unit (STALO) 22 for generating the reference frequency signals $f_1$, $f_2$, $f_3$, and $f_{xmit}$ which are provided to a receiver unit 24 and a transmitter unit 26, respectively. The output of the transmitter 26 is coupled to the input port of a conventional circulator 28 with the output port thereof coupled to a low noise amplifier 30. The bidirectional port of the circulator 28 is coupled to the antenna unit 20. The receiver 24 receives its input from the low noise amplifier 30 and provides its output to an analog-to-digital (A/D) converter 32 which is, in turn, coupled to a corner turn memory 34. A digital processor 36 is coupled to both the memory 34 and a beam steering computer 38 which is used to provide control signals to the phase shifters of the antenna 20 over signal lines 40.

The phased array antenna 20 may be comprised of an array of phase shifters implemented from rapidly switching microwave circuits, like gallium arsenide field effect transistors, for example, which are digitally commanded to selectable insertion delays. Each phase shifting element may contain an electronic memory for storing calculated phase commands obtained from the beam steering computer 38 under a simple, rapid access address via lines 40. This type of embodiment permits the achievement of rapid beam agility permitting the antenna beam to be transferred from one ambiguous position to another in a very short time, like on the order of 1 microsecond, for example.

Accordingly, the reference frequencies generated by the STALO 22 for the transmitter and receiver units 26 and 24, respectively, may be switched to separate coincident radar returns from the different beam directions utilizing the anticipated, desired return and angle of arrival. Under these conditions, the amount of frequency channel spacing should be sufficient to provide the spectrum of an adjacent channel from interfering with the desired return signal. The number of lines of sight or beam directions which may be formed during an interpulse period of a conventional pulse of the radar wave form may be limited by the return spectrums and the inherent bandwidths of the microwave circuits included in the radar. For convenience, the reference frequency signals $f_1$, $f_2$, $f_3$, and $f_{xmit}$ should be switched as rapidly as the antenna beam direction via the STALO 22.

The corner turn memory 34 may be larger in size and somewhat more extensive than conventional radar memories because of the interleaving of interpulse periods. That is, designated targets and modes associated therewith may be scheduled into the same PRF and utilize the unused portions of the interpulse period. Due to the simultaneous processing of the receiver 24, the echo samples of the corner turn memory 34, which may be indexed for each interpulse period, may have an index which can be interpreted to recover the echo signal's range, bearing reference frequency, and mode wave form. In addition, the beam steering computer 38 may calculate the appropriate phase shift commands for each element of the antenna system 20 from the desired pointing angle, assigned frequency channel, and element physical location for each beam direction or line of sight. Noteworthy is the fact that by scheduling the time events of multiple targets within a compatible interpulse timing, the calculation and communication of phase commands, timing and other data is greatly simplified. That is, the beam direction commands remain the same for all interpulse periods and therefore, may only be calculated but once for a coherent integration period or look. Once calculated, the beam steering commands may be stored in a rapidly accessible electronic memory at the respective antenna element of the unit 20. Accordingly, by an appropriate common timing, the proper beam steering command can be recalled at each element at the proper time.

It is the digital processor 36 which maintains the scheduling of time events or controls the sequence of operations of the instant radar embodiment. In one example, the digital processor 36 may provide the target report scheduling to the beam steering computer 38. These reports include the beam directions of detected targets on which mode operations are to be performed along with the schedule of mode dwell times associated therewith within the frame time of the radar. Generally, the digital processor 36 may provide similar scheduling information to the STALO 22 and transmitter 26 utilizing signal lines 44.

In a pulse doppler radar, transmit pulses are generated by the transmitter unit 26 enveloping the RF wave forms supplied thereto by the STALO 22 in accordance with the scheduled time provided by the digital processor 36. The transmit pulses are conducted through the circulator 28 to the antenna 20 and therefrom transmitted into the beam direction as controlled by the beam steering computer 38 according to the target schedule instructions received from the digital processor 36. Echo signals are received from the instantaneous beam directions by the antenna 20 and conducted through the circulator 28, low noise amplifier 30 to the receiver 24.

The receiver 24 frequency conditions the echo radar wave forms with the reference signals $f_1$, $f_2$, $f_3$ in accordance with the target schedule instructions provided by the digital processor 36 via STALO 22. The frequency conditioned echo signals are then digitized by the A/D converter 32 and stored in the corner turn memory with the proper indexing as described above. The digital processor 36 may then access the radar wave form information to perform the doppler processing thereof for each coherent integration period.

The concern of the specific disclosure is with the scheduling of many targets and the mode dwell times associated therewith competing with each other for the same time interval within the frame time, each requiring the same mode wave form and processing using the digital processor 36. As indicated above, the time slot of the frame time under competition may be greater than the mode dwell time, but less than the time for a separate mode dwell time for each competing target. It is assumed, for the present example, that each target, of known and ambiguous range and doppler velocity, is visible in a plurality of medium PRF's and each span of visibility ensures a modulo load range and process doppler frequency minimizing main and side lobe clutter in the a priori receive window meshed filters of the receiver 24.

Thus, the digital processor 36 may utilize an interpulse digital algorithm for load updating many angularly displaced, commonly visible targets in one PRF dwell time or look. The algorithm may additionally perform the task of sorting the designated targets into PRF's in a manner which minimizes the number of time slots or time interval of the radar frame time. As a result, the time required to mode update all of the detected targets may be minimized. In summary, the problem is to provide a time scheduling algorithm taking as input a large number of targets displaced in angle, range, and velocity by grouping the targets according to common PRF visibility and interpulse scheduling compatibility.

Figure 3:
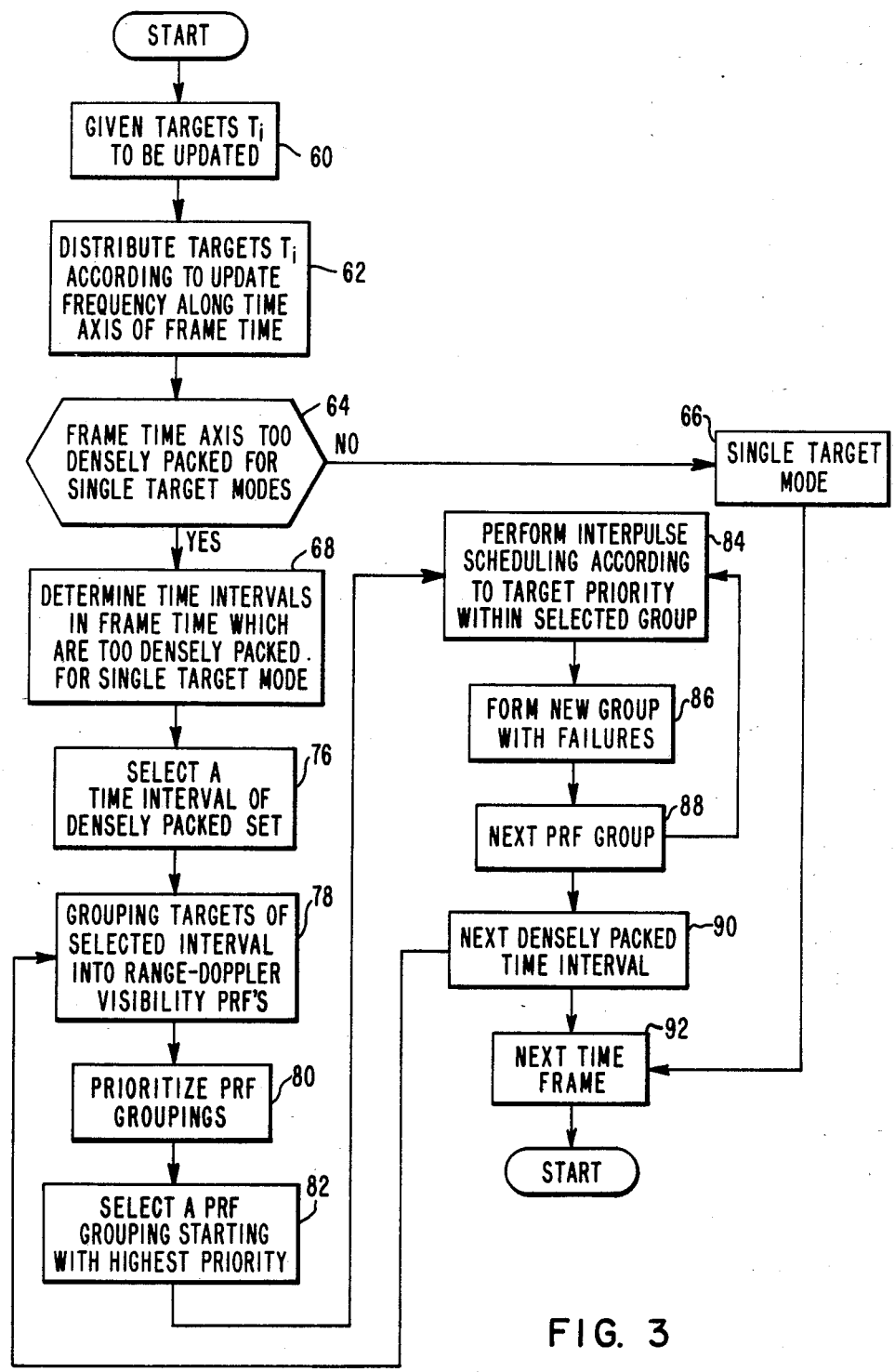
FIG. 3 is a flowchart of method steps suitable for embodying the various aspects of the present invention.
Figure 4:
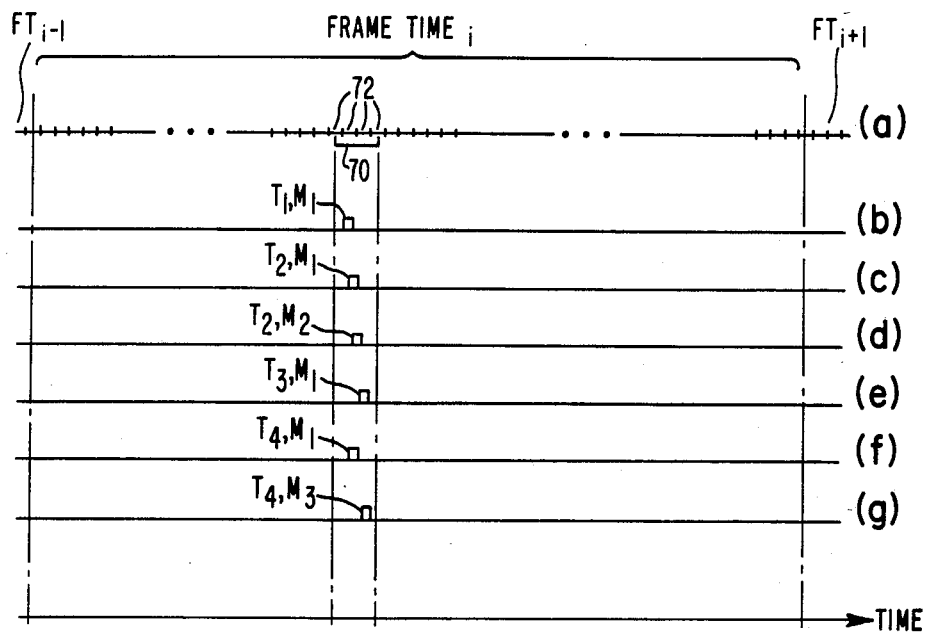
FIG. 4 is a graphical illustration of the multiple scheduling of mode dwell times to a common time interval of a radar frame time.

An example of such an algorithm is shown in the flow chart of FIG. 3. The flow chart of FIG. 3 may be used as a guide for programming the digital processor 36 of the radar embodiment in order to provide a method for scheduling a sequence of time events within an interpulse period used as a fundamental periodic construct to achieve merging of target mode dwell time combinations competing for the same time interval in a frame time in order to provide a high data throughput rate for the radar. This method may form a steady state, repetitive process over the coherent dwell time of pertinent radar modes to allow data gathering from multiple beam positions in a time conventionally used for a single line of sight. The flow chart of FIG. 3 may be described in connection with the timing wave forms of FIGS. 4, 5, and 6. It is assumed that the radar is operating in a steady state process with a large portion of the frame time devoted to searching for targets and that a number of targets have been detected within the designated search regions. It is further assumed that certin functional modes of the radar are to be conducted on the radar wave forms received from the detected targets and that each of the target mode combinations have an update frequency assigned thereto. When the term targets $T_i$ is referred to in describing the flow chart of FIG. 3, it is assumed that a target mode combination is intended.

Starting with the first block 60 of the flow chart of FIG. 3, the memory stored information of the designated targets $T_i$ along with their update frequencies are provided to the program. In block 62, the mode dwell times associated with a target $T_i$ are distributed along the time axis of the frame time of the radar according to the update frequency thereof. Next, in decisional block 64 it is determined if there are any time intervals in the frame time which are densely packed, that is, have more than one mode dwell time scheduled therefor. If the answer is none, then a single target mode is performed in accordance with the instructions of block 66 and thereafter the next time frame is analyzed by repeating the steps 60, 62, and 64. If there is more than one time interval of the same time which is scheduled to perform more than one mode dwell time operation, then program execution continues with block 68.

In accordance with the present invention then, once it is determined that one or more time intervals within the frame time are densely packed to eliminate the single target mode of operation under the constraints of the fixed frame time, there is a need for interpulse interleaving in order to merge the target mode dwell times scheduled for a common time interval. One illustration of this multiple scheduling of mode dwell times is shown in the time wave forms (a)-(g) of FIG. 4. According to the instructions of flow chart block 68, the time interval 70 comprising the time slots 72 of the frame time i may be scheduled to perform multiple mode dwell time functions as indicated by the time wave forms of (b) through (g). For example, target T1 is scheduled to perform the functional mode M1, target T2 is scheduled to perform functional modes M1 and M2, target T3 is scheduled to perform functional mode M1 and finally target T4 is scheduled to perform M1 and M3. The primary functional mode performed on a target is to maintain track of the target, but additional mode functions, which may include the range measured unambiguously, the target I.D. wave form, identifying and classifying the target, a raid or cluster count, or a launch search, for example.

After the densely packed time intervals are determined in 68, one of them like 70, for example, may be selected by block 76. The targets of the selected interval 70 are next grouped into range-doppler visibility PRF's in accordance with the instructions of block 78. Each of the given targets of the interval has its range, velocity, and angle information stored in the memory 34. Thus, the given targets may be expressed mathematically by the following expression:

$$T_i (r_i, v_i, \theta_i), \text{ for } i=1, N_T; \quad (5)$$

where $T_i$ is a target in the selected time interval, and $r_i$, $v_i$, $\theta_i$ are the range, velocity and angle measurements of the target $T_i$ and provide the a priori information therefore. In addition, $N_T$ is representative of the total number of targets within the selected densely packed time interval. Each target of the interval also will include an index $M_i$ for the functional mode operation which is scheduled to be performed thereon.

The targets may be classified into PRF groups according to their range and doppler visibility under the corresponding PRF. The forming of the groups is dependent only on the range $r_i$ and $v_i$ of the target. For example, the arithmetic for determining that the target is visible in a range, is to take the unambiguous range to the target as it has been previously determined and perform modulo arithmetic according to the ambiguous range of that PRF. So it is the remainder of the modulo division on $r_i$ which determines the target visibility for the corresponding PRF. That is, it would not be considered visible in the PRF group if that remainder were a very small number and the target echo was being received coincident with the blanking time of transmission. If, however, the transmission time was changed by altering the PRF of the radar, a resulting echo signal would appear and be stored in the corner turn memory rendering the associated target range visible.

Velocity visibility may be determined in a similar way except that its arithmetic is based on doppler principles. After performing the modulo arithmetic using the desired PRF frequency, the processed doppler frequency should not, except for slow radial moving targets, lie within the spread of the main beam clutter of the filter bank of the radar which is something which may be predicted. Accordingly, if it lies outside the main beam clutter, it may be considered to be doppler visible. Thus, to classify a target as being visible in the PRF, it must be both range visible and doppler visible for the present embodiment. It is understood that the set of PRF's for the exemplary method contains a sufficient number (i.e. set) of differing prf's to make any of the potential targets visible in at least one of the prf's.

The groupings are such that targets may be expressed mathematically by the following expression:

$$G_j = (T_m, m: 1 \leq m \leq N), \text{ and} \quad (6)$$

$$j = 1, N_{PRF}, \quad (7)$$

where $G_j$ is the set of targets which are commonly visible in the PRF j. Note that the intersection of these sets need not be the null set, i.e., $G_j \cap G_i = \phi$, that is to say, $G_j$ and $G_i$ need not be mutually exclusive. It is noteworthy to point out that the targets within the sets $G_j$ will include all of the detected, visible targets in the searchable region of the radar and not to any single direction or null band of directions. That is, the forming of the groups $G_j$ is not dependent on the angle of the target.

In the next instructional block 80, the PRF groupings $G_j$ are prioritized according to some predetermined priority scheme. In the present embodiment, the method chosen is to assign the group $G_j$ with the most number of targets the highest priority, and the group with the next highest number of targets the next highest priority, and so on. The group with the highest priority is selected first in the block 82 with the interleaving of the interpulse periods of the targets of the selected group taking place in block 84. Prior to the interleaving step, some target priority may be performed within the selected group. This target prioritization may be conducted according to some vital parameter of the target which may be a factor in scheduling the functional mode processing thereof. In the present example, the velocity of the target may be used for priority determination. That is, the program would most likely want to track a threatening, fast moving missile with a higher update frequency than it would want to track an aircraft which is slower moving.

Figure 5:
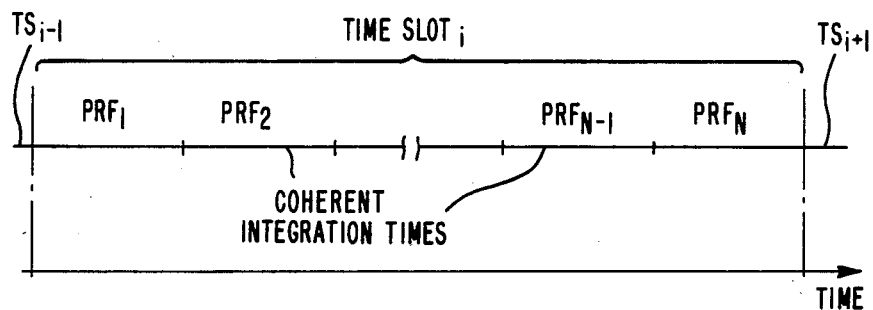
FIG. 5 is a time graph illustrating the PRF variation from one coherent integration time to another in a common time interval.
Figure 6:
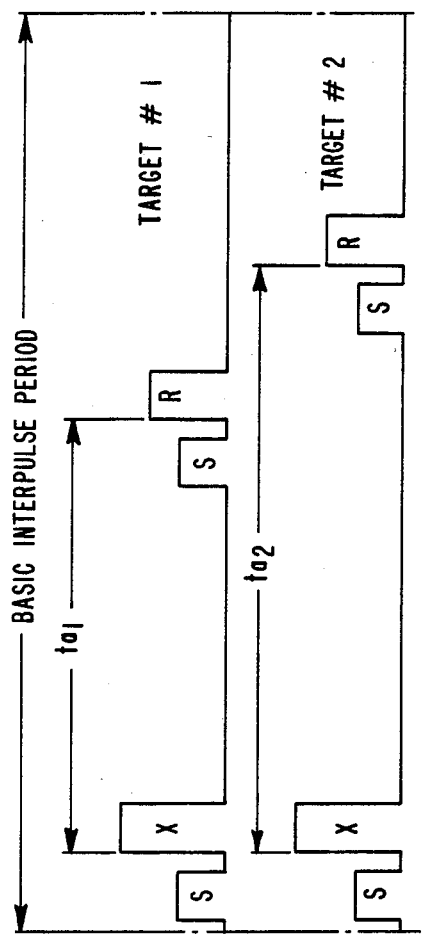
FIG. 6 exhibits time diagrams for the essential time events for two exemplary targets and depicting their various ambiguous delay times $t_{ai}$.
Figure 7:
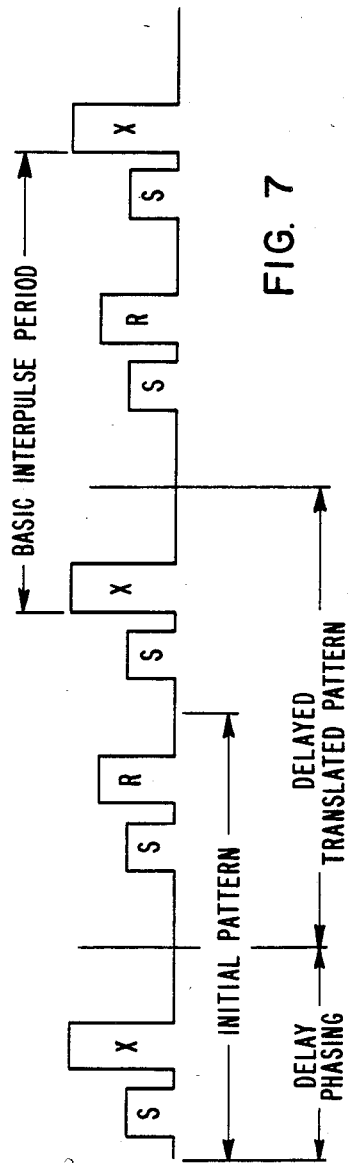
FIG. 7 is a time graph illustrating the trial and translate processes involved in the time position interleaving of different target time event patterns with respect to a fixed interpulse period to avoid eclipsing of the time events.

After the targets are prioritized within the selected PRF group, the time event patterns thereof are ready to be interleaved which will be described in connection with the time forms of FIGS. 5, 6 and 7. Normally, for functional mode data gathering purposes, a number of coherent integration operations or looks are effected for a given target with the PRF varying with each look. This is illustratively depicted in the time waveform of FIG. 5. For example, in the time slot i of the radar frame time N, coherent integration times may be provided for with the PRF's varying from $PRF_1$ to $PRF_N$. Practically, the number of coherent integration times will be on the orderof 3 to 5 for most purposes. With each coherent integration time, there will generally be a multiple of fixed interpulse periods, each fixed interpulse period of the chain having a time dwell which is the reciprocal of the corresponding PRF of the coherent integration period.

Multiple targets are updated during the coherent dwell by arranging each of their respective patterns of time events in a non-conflicting fashion. The essential time events for two exemplary targets #1 and #2 are diagrammed in FIG. 6, and it should be noted that this pattern of switching-S, transmit-X, switching-S, and receive-R repeats for each member target at the same time periodicity ($ta_i$ being the ambiguous delay time) and may be translated by varying the start or phase of the period of the target time event pattern with respect to the fixed interpulse period. In interleaving the time event patterns of the various targets of the selected PRF group, say $PRF_j$, for example, the concept is to have a rule for positioning these different event patterns of the interpulse periods of the various targets so that the events thereof do not eclipse each other. That is, to avoid the transmission of a pulse towards one target while receiving an echo pulse from another coincidently, for example. The interpulse scheduling rule resolves these conflicts and allows the scheduling of multiple targets in the same interpulse period and consequently the same PRF coherent dwell time.

In the state of the art, such scheduling rules are known categorically as linear programming algorithms and pertain to the class of mathematical problems of partitioning limited resources (time) among desired tasks (targets) in optimizing fashion (maximize the number of targets scheduled within the basic interpulse period). The scheduling rule to be described does not maximize the number of targets, specifically. Such an algorithm must examine all possible permutations/combinations of target ordering and would be called factorial or exponential due to number of digital machine operations necessary for their implementation. The algorithm to be described is suboptimal because it does not assure specifically that the maximum number of targets has been scheduled and is called linear because the number of operations is proportional to the number of targets. This rule will nearly saturate the available time in applications with large numbers of targets dispersed in range and might be considered "best" in a practical sense.

The pattern for the target under consideration, i.e., the highest priority target remaining unscheduled, is trial fitted into the previously established schedule. For the first target attempted, the previously established schedule corresponds to the case of all quanta of time within the basic interpulse period being uncommitted. Subsequent targets will encounter portions of the basic interpulse period committed to a time event (i.e., switching, transmitting or receiving) for a respective target. The trial fit fails if the trial pattern requests either the performance of more than one time event or the event for more than one target. A new trail fit would then be fashioned by translating the former trial pattern quanta in basic interpulse time. Since trail patterns are periodic in origin, such a translation may amount to delaying the pattern start phasing (see FIG. 7).

This trial and translate process is repeated until either the trial succeeds or the translation returns to its initial test state. In the event of success, the previous schedule of respective target events is updated to include the successful trial pattern, and the now scheduled target is removed from any PRF visibility groups awaiting similiar scheduling considerations.

In the rare case in which a target may not be capable of fitting within the interpulse period according to the scheduling rule applied, the event pattern of the target may be saved and a new group formed from these failures in block 86. This new group may be reprioritized within the other PRF groupings formed in accordance with the instructions of block 80. In block 88, the next highest priority PRF group is selected and the interpulse scheduling procedures of block 84, 86 and 88 are repeated. Thus, the set of blocks 84, 86 and 88 are executed repeatedly for each of the PRF groups which are formed by blocks 78 and 86. Thereafter, program execution may continue at block 90 wherein the next densely packed time interval of the time frame is selected.

The process of prioritizing the target and interpulse scheduling is thus repeated for each of the densely packed time intervals identified by block 68. After all the identified time intervals have been handled by the aforementioned procedure, the program proceeds to the next frame time i+1 and program execution starts over. It is understood that from frame time to frame time, the number of targets are continuously changing and the functional modes associated therewith are varying in both type and update frequency. The foregoing method in accordance with the flow chart of FIG. 3 takes into account the desirable adaptability of this changing environment.

In summary, the foregoing disclosure provides a specific embodiment for achieving radar performance improvement by a generic data rate increase. The embodiment describes a steady state, repetitive process over the coherent integration time. The scheduling and sequencing of events during a representative pulse doppler interpulse period form a fundamental periodic constuct within the framework of pertinent conventional radar mode processing. The benefits provided from the above described embodiment include the generic increase of processable information and imaging flexibility by rapid beam agility in an environment with information bearing regions or targets angularly separated and disjointed. This increase in data rate avails more information for optimal system management of resources of the radar system.

More specifically, the benefits include an increase in the portion of radar frame time allotable to the search function in an interleaved track-while-search organization in a numerous target, high track update environment. As a corollary, radar operation in a flexible frame time organization could minimize frame time. Moreover, multiple, look-to-look frequency independent data for overlay or scintillation processing may be obtained in the time conventionally required for a single look. For example, the time required to produce high quality spotlike synthetic aperture radar (SAR) images through multilook overlay may be reduced. As a further corollary, the exposure time, altitude, and radar emission time may be minimized thereby increasing survivability in a hostile target environment. Still further, there is provided a method for efficiently imaging multiple locales at dispersed lines of sight in the time conventionally required to image one. This affords enhanced probability of mission success through contingency, increased arrivability, and conservation of processing resources by flexible partioning of complex, elongated terrain features of interest.

A radar achieving increased data rates through fast switching of phase delays in a phased array antenna has been described wherein multiple independent lines of sight or beam directions may be observed by the radar in the time conventionally taken for a single line of sight. The organization of the beam's sequencing is an arrangement of the time event sequence within an interpulse period. Repetitive, periodic use of this sequence simplifies the beam's steering command calculation and transmittal. The timed events remain mutually uneclipsed through the choice of an appropriate PRF and targets. The above method exploits beam and frequency agility speeds which are small compared to the interpulse periods chosen.

We claim:

1. In an agile beam coherent radar, a method of time scheduling mode dwell times corresponding to a multiplicity of targets, displaced in angle, range and velocity, in a radar frame time without reducing the performance of said radar, said method comprising the steps of:
   scheduling a plurality of said target mode dwell times to a common time interval of said radar frame time;
   grouping the targets of said common time interval into a set of pulse repetition frequencies (PRF's) which make said targets visible in both ange and doppler;
   prioritizing the PRF groupings of the set from a highest to a lowest priority;
   varying the PRF of the radar from the highest priority PRF to the lowest priority PRF of the set sequentially corresponding to the coherent integration times of the common time interval; and
   interleaving the time event patterns of said targets of a PRF grouping for a coherent integration time in accordance with a predetermined rule to avoid eclipsing of the time events thereof, whereby data gathering from targets in multiple beam positions may be performed in a time conventionally used for a single line of sight of said radar.

2. The method in accordance with claim 1 wherein the step of prioritizing includes the step of assigning the priority to each PRF group of the set based on the number of targets grouped in each, the PRF group with the most targets being assigned the highest priority and the PRF group with the least targets being assigned the lowest priority.

3. The method in accordance with claim 1 including the step of prioritizing the targets within each PRF grouping in accordance with a vital parameter significant to scheduling the mode processing thereof.

4. The method in accordance with claim 1 wherein the step of interleaving includes interleaving the time event patterns of the targets of a PRF grouping by time positioning the different target event patterns with respect to the interpulse period of the PRF of the target grouping to avoid eclipsing of said events, whereby the time events of the interpulse period set by the PRF are scheduled in accordance with a fundamental periodic construct to achieve merging of the target mode dwell time in the common time interval in a non-conflicting fashion.

5. The method in accordance with claim 4 including the step of forming a new group of targets from any target-time event pattern which could not be time positioned with respect to the interpulse period to avoid eclipsing of time events.

6. In an angle beam coherent radar, a method of scheduling time events with respect to a fixed interpulse period used as a fundamental periodic construct of a coherent integration period of said radar to achieve merging of a plurality of targets competing for said coherent integration period, said method comprising the step of interleaving the time event patterns of said plurality of targets of a common coherent integration period by trial fitting the different target time event patterns with respect to said fixed interpulse period thereof to avoid eclipsing of said time events, said step of trial fitting including the steps of:
   initially time positioning a former target pattern of said plurality to a trial position with respect to the fixed interpulse period;
   determining if said trial position renders eclipsing of time events of said former target pattern with time events of previously fitted target patterns; and
   translating said former target pattern to a new trial position by varying the pattern start phasing thereof with respect to the fixed interpulse period when a trial position is determined to render eclipsing of time events.

7. The method in accrdance with claim 6 wherein the step of translating includes translating the former target pattern to a new trial position by delaying the pattern start phasing thereof with respect to the fixed interpulse period when a trial position is determined to render eclipsing of time events.

8. The method in accordance with claim 6 including the steps of:
   prioritizing the competing targets from a highest to a lowest priority level; and
   trial fitting the time event patterns of the competing targets in time position with respect to the fixed interpulse period, starting with said highest priority and continuing to the lowest priority of said competing targets, with the purpose of avoiding eclipsing of the time events thereof.

* * * * *